R. L. GREENLEAF.
HEEL AND RAND TRIMMER.
APPLICATION FILED DEC. 16, 1914.
1,153,780. Patented Sept. 14, 1915.
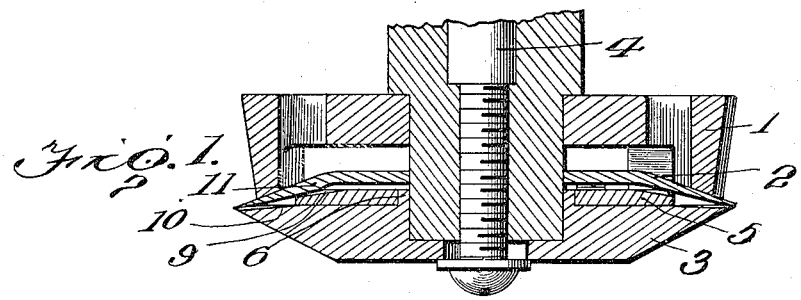
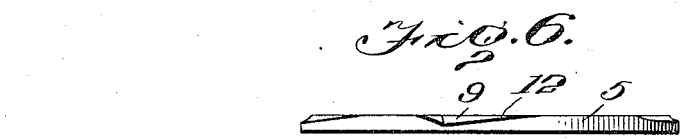
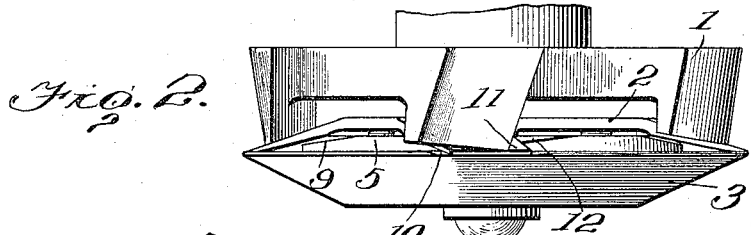
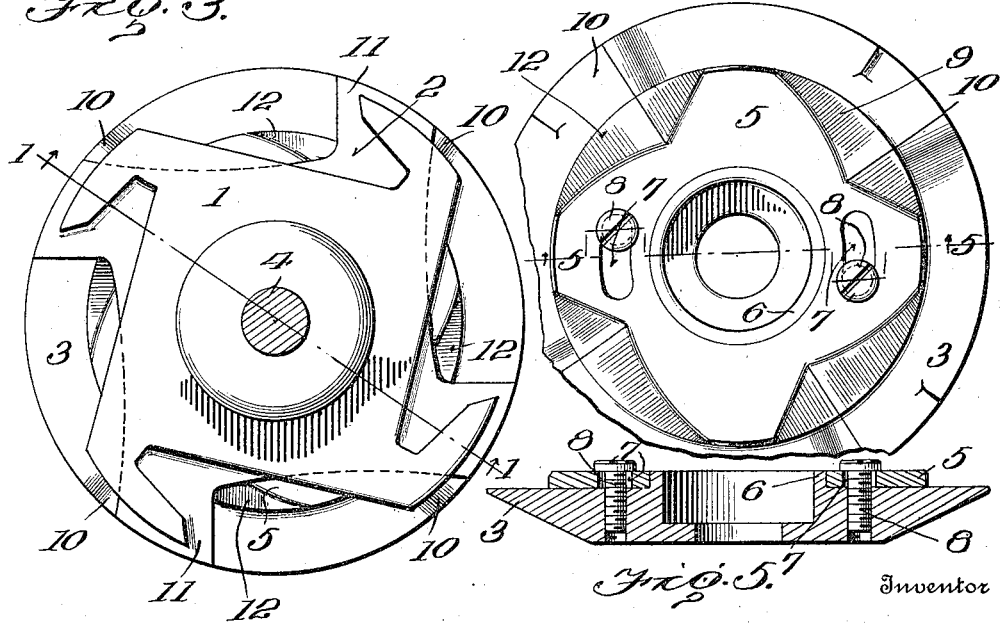
Inventor
R. L. Greenleaf.

UNITED STATES PATENT OFFICE.

RUPERT L. GREENLEAF, OF BROCKTON, MASSACHUSETTS.

HEEL AND RAND TRIMMER.

1,153,780.   Specification of Letters Patent.   Patented Sept. 14, 1915.

Application filed December 16, 1914. Serial No. 877,552.

*To all whom it may concern:*

Be it known that I, RUPERT L. GREENLEAF, a citizen of the United States, residing at Brockton, in the county of Plymouth and State of Massachusetts, have invented certain new and useful Improvements in Heel and Rand Trimmers, of which the following is a specification.

This invention relates to heel and rand trimmers, and has for its object the provision of means whereby the operator may cut any desired width of rand.

A further object of the invention is to relieve the edge of the shield from the strain now placed thereon, the present invention being designed more particularly for use in connection with the trimmer shown in Letters-Patent, No. 1,093,846, granted to me April 21st, 1914.

The present invention consists in certain novel features which will be hereinafter first fully described and then more particularly pointed out in the claims following the description.

In the accompanying drawings: Figure 1 is a diametrical section of a cutter having my present improvements applied thereto; Fig. 2 is a side elevation of the same; Fig. 3 is a plan view thereof, the dotted line 1—1 of this figure indicating the plane upon which the section in Fig. 1 is taken; Fig. 4 is a plan view of the washer and shield removed from the cutters; Fig. 5 is a section on the line 5—5 of Fig. 4; and Fig. 6 is a detail edge view of the washer.

The edge cutter 1, the lip cutter 2 and the shield 3 are preferably of the same construction and arrangement shown in my above-mentioned patent and may be secured to the shaft 4 in the usual manner.

In carrying out my present invention, I interpose between the shield and the lip cutter a washer 5 which is disposed concentric with the shield and may fit against an internal annular shoulder or rib 6 formed thereon. This washer is provided at diametrically opposite points with arcuate slots 7 having their centers co-incident with the axis of the shaft 4 and the shield and cutters, and through the said slots retaining screws or stops 8 are inserted into the shield, as shown most clearly in Figs. 4 and 5. These slots and the screws or other form of stops permit the washer to be moved relative to the shield and thereby adjust the same to regulate the work of the lip cutter.

In the upper surface of the washer, at the edge thereof, I provide recesses 9 which, like the recesses or seats 10 in the shield, are deeper at their rear ends than at their forward ends, but are approximately twice as long as the recesses or seats in the shield, the cutting points or lips 11 of the lip cutter 2 extending through these recesses or seats 9 into the recesses or seats 10 and bearing upon the forward walls 12 of the same.

As shown in the drawings, the washer is fitted to the shield with the several recesses in the washer registering with those in the shield, and the lip cutter is placed over the washer with its forward cutting edges bearing upon the longer walls of the recesses in the washer. The edge cutter is then placed over the lip cutter and the several parts secured upon the shaft, as shown and as will be readily understood.

With the parts disposed as shown more clearly in Fig. 4, it will be readily understood that, if the washer be moved toward the right in said figure, the lips of the cutter 2 will be moved from the shield so that an open rand will be cut, whereas, if the washer be moved toward the left in said figure, the lips of said cutter will be permitted to lie close upon the shield and a thinner rand will be cut. The lip cutter is constructed of a preferably resilient plate so that it arches over the washer and thereby provides clearance throughout its extent for the dust and cuttings and avoids choking of the cutter. As the lip cutter engages the washer, it will spring into the proper position with the proper clearance before it touches the shield and, consequently, will relieve the edge of the shield from all the strain heretofore put thereon, and as a result of this arrangement, the shield may be made lighter and also hollow so as to reduce the friction and the heating of the cutter. The cutter is also more firmly supported than heretofore so that it may be made lighter and more resilient and will not become loosened when trimming rubber soles.

It will be understood, of course, that the number of teeth or cutting points is immaterial but the recesses in the washer and the shield should correspond in number to the teeth of the lip cutter. As the recesses are deeper at their rear ends than at their front ends, an even clearance for the lip cutter is provided and the cutting edge is firmly supported in operative position.

Having thus described the invention, what is claimed as new is:—

1. In a device of the character set forth, the combination with a shield, and a lip cutter disposed upon the shield, of means between the shield and the cutter for adjusting the said cutter to and from the shield.

2. In a device of the character set forth, the combination with a shield, and a lip cutter disposed thereon, of means interposed between the shield and the cutter for supporting the cutting lips and adjusting the same to and from the shield.

3. In a device of the character set forth, the combination with a shield, and a lip cutter disposed thereon, of a washer interposed between the shield and the cutter and provided in its edge with recesses having walls engaging the lips of said cutter, said washer being movable relative to the shield whereby the walls of said recesses will raise or lower the cutting lips.

4. In a device of the character set forth, the combination with a shield having recesses in its upper side, and a lip cutter disposed over the shield and having lips adapted to seat in said recesses, of a washer interposed between the shield and the cutter and provided at its edge in its upper side with recesses having walls engaging the lips of the cutter, all of said recesses being deeper at their rear ends than at their front ends.

5. In a device of the character set forth, the combination with a shield, and a lip cutter disposed over the shield, of a washer interposed between the shield and the cutter and provided at its edge with recesses having walls engaging the lips of the cutter and provided at diametrically opposite points with arcuate slots, and stops inserted through said slots into the shield.

In testimony whereof I affix my signature in presence of two witnesses.

RUPERT L. GREENLEAF. [L. S.]

Witnesses:
 CARL TOBY DERRY,
 CHARLES G. WILLARD.

Copies of this patent may be obtained for five cents each, by addressing the "Commissioner of Patents, Washington, D. C."